United States Patent
Bulan et al.

(10) Patent No.: US 9,171,213 B2
(45) Date of Patent: *Oct. 27, 2015

(54) TWO-DIMENSIONAL AND THREE-DIMENSIONAL SLIDING WINDOW-BASED METHODS AND SYSTEMS FOR DETECTING VEHICLES

(71) Applicant: Xerox Corporation, Norwalk, CT (US)

(72) Inventors: Orhan Bulan, Rochester, NY (US); Wencheng Wu, Webster, NY (US); Yao Rong Wang, Webster, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 308 days.

This patent is subject to a terminal disclaimer.

(21) Appl. No.: 13/835,386

(22) Filed: Mar. 15, 2013

(65) Prior Publication Data

US 2014/0266803 A1   Sep. 18, 2014

(51) Int. Cl.
*B60Q 1/48* (2006.01)
*G06K 9/00* (2006.01)
*G08G 1/04* (2006.01)
*G08G 1/14* (2006.01)
*G06K 9/20* (2006.01)
*G06K 9/32* (2006.01)
*H04N 7/18* (2006.01)
*H04N 5/225* (2006.01)
*G06K 9/62* (2006.01)

(52) U.S. Cl.
CPC ........ *G06K 9/00785* (2013.01); *G06K 9/00771* (2013.01); *G06K 9/2054* (2013.01); *G06K 9/3241* (2013.01); *G08G 1/04* (2013.01); *G08G 1/147* (2013.01); *G06K 9/6256* (2013.01); *G06K 2209/23* (2013.01)

(58) Field of Classification Search
USPC ........................ 340/932.2; 348/148, 149, 169
See application file for complete search history.

(56) References Cited

U.S. PATENT DOCUMENTS

| | | |
|---|---|---|
| 3,110,010 A | 11/1963 | Smith |
| 3,158,836 A | 11/1964 | McCauley |
| 3,376,547 A | 4/1968 | Auer, Jr. |
| 4,812,843 A | 3/1989 | Champion, III et al. |
| 4,847,772 A | 7/1989 | Michalopoulos et al. |
| 5,091,727 A | 2/1992 | Mahmood |
| 5,103,400 A | 4/1992 | Yamada et al. |
| 5,131,020 A | 7/1992 | Liebesny et al. |
| 5,163,000 A | 11/1992 | Rogers et al. |
| 5,199,108 A | 3/1993 | Morgan et al. |
| 5,241,380 A | 8/1993 | Benson et al. |
| 5,343,237 A | 8/1994 | Morimoto |
| 5,396,429 A | 3/1995 | Hanchett |

(Continued)

OTHER PUBLICATIONS http://www.nytimes.com/2011/09/19/nyregion/uprooting-the-old-familiar-parking-meter.html?_4=1&goback+%2Egde_153603_member_72027013, Dated Sep. 18, 2011; 3 pgs.

(Continued)

*Primary Examiner* — Jack K Wang
(74) *Attorney, Agent, or Firm* — Fay Sharpe LLP

(57) ABSTRACT

Provided is a method and system for efficient localization in still images. According to one exemplary method, a sliding window-based 2-D (Dimensional) space search is performed to detect a parked vehicle in a video frame acquired from a fixed parking occupancy video camera including a field of view associated with a parking region.

30 Claims, 14 Drawing Sheets

(56) References Cited

U.S. PATENT DOCUMENTS

| | | | |
|---|---|---|---|
| 5,432,508 | A | 7/1995 | Jackson |
| 5,504,314 | A | 4/1996 | Farmont |
| 5,509,082 | A | 4/1996 | Toyama et al. |
| 5,526,041 | A | 6/1996 | Glatt |
| 5,649,300 | A | 7/1997 | Snyder et al. |
| 5,666,157 | A | 9/1997 | Aviv |
| 5,748,107 | A | 5/1998 | Kersken et al. |
| 5,751,973 | A | 5/1998 | Hassett |
| 5,777,951 | A | 7/1998 | Mitschele et al. |
| 5,910,782 | A | 6/1999 | Schmitt et al. |
| 5,940,481 | A | 8/1999 | Zeitman |
| 6,285,297 | B1 | 9/2001 | Ball |
| 6,340,935 | B1 * | 1/2002 | Hall ............................ 340/932.2 |
| 6,442,474 | B1 | 8/2002 | Trajkovic et al. |
| 8,971,581 | B2 * | 3/2015 | Wu et al. ........................ 382/104 |
| 2009/0179776 | A1 * | 7/2009 | Holden ....................... 340/932.2 |
| 2012/0148105 | A1 | 6/2012 | Burry et al. |
| 2012/0263346 | A1 * | 10/2012 | Datta et al. .................... 382/103 |
| 2013/0057686 | A1 * | 3/2013 | Genc et al. .................... 348/148 |

OTHER PUBLICATIONS

Wren et al., "Pfinder: Real-Time Tracking of the Human Body", in IEEE Transactions on Pattern Analysis and Machine Intelligence, Jul. 1997, vol. 19, No. 7, pp. 780-785.

Friedman et al., "Image segmentation in video sequences: A probabilistic approach", in Proc. of the Thirteenth Conference on Uncertainty in Artificial Intelligence (UAI), Aug. 1-3, 1997, pp. 1-13.

Stauffer et al., "Adaptive background mixture models for real-time tracking", in Proc. of the 1999 Conference on Computer Vision and Pattern Recognition (CVPR '99), 1999, 7 pages.

Makarov et al., "Intrusion detection using extraction of moving edges", in $12^{th}$ IAPR Int. Conf. on Pattern Recognition, vol. 1 of IAPR, pp. 804-807, IEEE Press, 1994.

Paragious et al., "Detection and location of moving objects using deterministic relaxation algorithms", Vienna, Austria, Aug. 1996, 5 pages.

Oliver et al., "A Bayesian Computer Vision System for Modeling Human Interactions", IEEE Transactions on PAMI, pp. 831-843.

Lo et al., "Automatic congestion detection system for underground platforms," Proc. of 2001 Int Symp. on Intell. Multimedia, Video and Speech Processing, pp. 158-161.

Prati et al., "Shadow Detection Algorithms for Traffic Flow Analysis: a Comparative Study", In Proc. IEEE Intelligent Transportation Systems, 2001, p. 1-6.

Cucchiara et al., "Improving Shadow Suppression in Moving Object Detection with HSV Color Information", Proc. of IEEE Intelligent Transportation Systems, 2001.

http://www.sanjoseca.gov/transportation/onstreet_regulations.htm, Aug. 6, 2012, 3 pages.

Lima et al., "High Definition Video Broadcast Over Core IP Networks", Mar. 2006, 11 pages.

http://www.portlandoregon.gov/transportation/article/59926, retrieved from the internet Aug. 6, 2012.

http://vancouver.ca/bylaws/2849c.pdf, Street and Traffic By-Law No. 2849, Oct. 18, 2011, 92 pages.

http://parkitnyc.com/parking-nyc/nyc-parking-tickets/, retrieved from the internet Aug. 6, 2012, 3 pages.

Agarwal et al., "Learning to detect objects in images via a sparse, part-based representation", Pattern Analysis and Machine Intelligence, IEEE Transactions on, vol. 26, No. 11, pp. 1-16, Nov. 2004.

Tsai et al., "Vehicle Detection Using Normalized Color and Edge Map," Image Processing, IEEE Transactions on, vol. 16, No. 3, pp. 850-864, Mar. 2007.

Duncan, et al., "Temporal edges: The detection of motion and the computation of optical flow", in Proc. Second Int. Conf. Comput. Vision, Tampa, FL, Dec. 1988, pp. 374-382.

Comaniciu et al., "Real-time tracking of non-rigid objects using mean shift", in: Proceedings of IEEE Conference on Computer Vision and Pattern Recognition (CVPR'00), South Carolina, 2000, pp. 1-8.

Kass et al., "Snakes: Active Contour Models", Int'l Journal of Computer Vision, pp. 321-331, 1988.

Dickmanns et al., "Dynamic monocular machine vision", Machine Vision and Applications p. 223-240, 1988.

Gustafsson et al., "Particle Filters for Positioning, Navigation and Tracking", IEEE Transactions on Signal Processing, 2002, p. 1-13.

U.S. Appl. No. 13/836,310, filed Mar. 15, 2013, Wu et al.

U.S. Appl. No. 13/914,752, filed Jun. 11, 2013, Bulan et al.

Ma et al., "Edge-based rich representation for vehicle classification", Proc. of IEEE Computer Vision (ICCV), 2005, 8 pages.

http://warondriving.com/post/9215745267/los-angeles-stop-sign-cameras, "War on Driving", 9 pages, Aug. 21, 2011.

http://www.thenewspaper.com/news/17/1742.asp, "Stop Sign Ticket Cameras Developed", May 9, 2007, 1 pg.

Lowe, "Distinctive Image Features from Scale-Invariant Keypoints", International Journal of Computer Visions, 2004, pp. 1-28.

Lucas et al., "An Iterative Image Registration Technique with an Application to Stereo Vision", pp. 674-679.

Matas et al., "Robust Wide Baseline Stereo From Maximally Stable External Regions", BMVC, 2002, pp. 384-393.

Black et al., "A Model for the Detection of Motion over Time", Proceedings of the International Conference on Computer Vision, Osaka, JP, Dec. 1990, 5 pages.

Harris et al., "A Combined Corner and Edge Detector", Plessey Research Roke Manor, UK, The Plessey Company plc., 1988, pp. 147-152.

Bay et al., "SURF: Speeded Up Robust Features", pp. 1-14, 2006, https://lirias.kuleuven.be/bitstream/123456789/71383/1/Bay_Tuytelaars_VanGool-surf-eccv06.pdf.

Wiegand et al., "Overview of the H.264/AVC Video Coding Standard", IEEE, Jul. 2003, p. 560-576.

U.S. Appl. No. 13/277,719, filed Oct. 20, 2011, Bulan et al.

U.S. Appl. No. 13/613,174, filed Sep. 13, 2012, Bernal et al.

http://www.osilaserscan.com/Products/Vehicle-Detection-and-Classification.aspx, 1 page.

http://www.nyc.gov/html/dof/html/parking/violation_codes.shtml, 4 pages.

http://www.nyc.gov/html/dot/html/motorist/truckrouting.shtml, 2 pages.

"High Definition Video Broadcast Over Core IP Networks", Claudio R. Lima et al. Sprint-Nextel, 1 Adrian Court, Burlingame, CA 94010, USA, 11 pages.

"The H.264 Advanced Video Compression Standard," Iain E. Richardson.

"Determining Optical Flow," B. K. P. Horn and B. G. Schunck, Artificial Intelligence 17 (1981), pp. 185-203.

"Survey on Block Matching Motion Estimation Algorithms and Architectures with New Results,"Y. W. Huang et al., Journal of VLSI Signal Processing Systems 42, Manufactured in The Netherlands, copyright 2006, Springer Science + Business Media, Inc., pp. 297-320.

Z. Zhang, "A Flexible New Technique for Camera Calibration," IEEE Transactions on Pattern Analysis and Machine Intelligence, vol. 22, No. 11, Nov. 2000, pp. 1330-1334.

http://ladot.lacity.org/tf_Trucks_on_Residential_Streets.htm, 1 page.

http://vatruckweb.vdot.virginia.gov/VaTruckRestrictions.aspx, 1 page.

http://www.cotrip.org/roadConditions.htm, 1 page.

U.S. Appl. No. 13/441,294, filed Apr. 6, 2012, Bernal et al.

U.S. Appl. No. 13/441,253, filed Apr. 6, 2012, Bulan et al.

U.S. Appl. No. 13/441,269, filed Apr. 6, 2012, Bulan et al.

U.S. Appl. No. 13/461,191, filed May 1, 2012, Fan et al.

U.S. Appl. No. 13/684,817, filed Nov. 26, 2012, Rong et al.

http://streetsmarttechnology.com, 2 pages, copyright 2011.

http://www.alibaba.com/product-gs/373281312/Ultrasonic_Parking_Sensor.html, 3 pages, copyright 1999-2013.

http://en.wikipedia.org/wiki/Hough_transform; 10 pages, Jan. 9, 2013.

http://www.cs.brown.edu/~pff/latent/, version 5, Sep. 5, 2012, 3 pages (http:people.cs.uchicago.edu/~rbg/latent/).

(56) References Cited

OTHER PUBLICATIONS

N. Dalal and B. Triggs "Histograms of Oriented Gradients for Human Detection", in 2005, CVPR, 8 pages.

T. Ojala, M. Pietikainen, and D. Harwood, "A Comparative Study of Texture Measures With Classification Based on Feature Distributions", 1996 Pattern Recognition, vol. 29, pp. 51-59, Department of Electrical Engineering, Oulu, Finland.

M. Nilsson, J. Nordberg, and I. Claesson, "Face Detection Using Local Smqt Features and Split up Snow Classifier", IEEE International Conference on Acoustics, Speech, and Signal Processing, 2007, Blekinge Institute of Technology, Ronneby, Sweden, pp. II-589-II-592.

F. Perronnin and C. Dance, "Fisher Kernels on Visual Vocabularies for Image Categorization", CVPR, 2007, Xerox Research Centre Europe, Meylan, France, 8 pages.

G. Csurka, C. Dance, J. Willamowski, L. Fan and C. Bray, "Visual Categorization With Bags of Keypoints", ECCV SLCV, 2004, 16 pages.

F. Perronnin, J. Sanchez and T. Mensink, "Improving the Fisher Kernel for Large-Scale Image Classification", ECCV, 2010, Xerox Research Centre Europe, 14 pages.

A. Neubeck and L. V. Gool, "Efficient Non-Maximum Suppression", ICPR, 2006, Computer Vision Lab, Zurich, Switzerland, 6 pages.

P. Felzenszwalb, R. Girshick, D. McAllester, D. Ramanan, "Object Detection With Discriminatively Trained Part-Based Models," IEEE Transactions on Pattern Analysis and Machine Intelligence, vol. 32, No. 9, Sep. 2010, pp. 1627-1645.

Constantine Papageorgiou and Tomaso Poggio, "A Trainable System for Object Detection", International Journal of Computer Vision, 38(1), pp. 15-33, 2000, Netherlands.

\* cited by examiner

TWO-DIMENSIONAL AND THREE-DIMENSIONAL SLIDING WINDOW-BASED METHODS AND SYSTEMS FOR DETECTING VEHICLES

BACKGROUND

The present disclosure relates to a video-based method and system for efficient vehicle detection/localization in still images obtained from a fixed video camera. The disclosed method and system are applicable to parking space management. However, it is to be appreciated that the present exemplary embodiments are also applicable to other like applications.

One challenge that parking management companies face while managing on-street parking is an accurate detection of available spaces. Conventional methods for detecting vehicle occupancy in parking spaces include non-video based sensing solutions. For example, "puck-style" sensors, shown in FIG. 1, typically use magnetometer readings to sense when a vehicle is detected in a parking space. Ultrasonic sensors, as shown in FIG. 2, operate by sending and receiving high frequency sonic waves and evaluating a parking area based on processing a signal that has been reflected back to the ultrasonic sensor. The detected information is wirelessly communicated to interested parties. One disadvantage associated with these sensor-based methods is a high cost for installation and maintenance of the sensors. In addition, the maintenance or replacement of a sensor may reduce parking efficiency if a parking space is made unavailable for the service work.

Another method being explored is a video-based solution. This method is shown in FIG. 3 and includes monitoring on-street parking spaces using non-stereoscopic video cameras. The cameras output a binary signal to a processor, which uses the data for determining occupancies of the parking spaces.

One shortcoming of both technologies is that they are designed for, and limited to, single-space parking configurations. On-street parking can be provided in two different configurations. A first configuration is shown in FIG. 4 and includes single-space parking, also known as stall-based parking, in which each parking space is defined in a parking area by clear boundaries. The parking spaces are typically marked by lines (shown in phantom) that are painted on the road surface to designate one parking space per vehicle. The second configuration is shown in FIG. 5 and includes multi-space parking, in which a long section of street is designated as a parking area to accommodate multiple vehicles. In this configuration, there are no pre-defined boundaries that designate individual parking stalls, so a vehicle can park at any portion extending along the parking area. In many instances, the multi-space parking configurations are more efficient because, when spaces are undesignated, drivers aim to fit more vehicles in a multi-space parking area having a same length as a single-space parking area.

At present, many departments of transportation are transitioning from single-space parking configurations to the multi-space parking configurations. Cities are eliminating parking meters and single-space parking configurations to reduce maintenance and other costs. The sensor-based methods are best suited for parking areas where painted lines typically demark a defined parking space for a single vehicle. However, an incorporation of the sensor-based methods for use in multi-space parking configurations is conceptually difficult and expensive to continue. Accordingly, this transition reduces a need for in-ground and other sensor-based methods.

Given the comparatively lower cost of a video surveillance camera, a video-based solution offers a better value if it is incorporated into a management scheme for monitoring multi-space parking configurations, as well as some applications of single-space street parking. Another advantage of a video-based solution is that one video camera can typically monitor and track several parking spots, whereas multiple sensors may be needed to reliably monitor one parking space in the single-space parking configuration. Additionally, maintenance of the video cameras is likely to be less disruptive than maintenance of in-ground sensors.

INCORPORATION BY REFERENCE

U.S. Pat. No. 6,285,297, issued Sep. 4, 2001, by Jay H. Ball, and entitled "Determining The Availability Of Parking Spaces";

U.S. application Ser. No. 13/836,310, filed Mar. 15, 2013, by Wu et al., entitled "Methods and System for Automated In-Field Hierarchical Training of a Vehicle Detection System";

U.S. application Ser. No. 13/441,294, filed Apr. 6, 2012, by Bernal et al., entitled "Video-Based Detector And Notifier For Short-Term Parking Violation Enforcement";

U.S. application Ser. No. 13/441,253, filed Apr. 6, 2012, by Bulan et al., entitled "Video-Based System And Method For Detecting Exclusion Zone Infractions";

U.S. application Ser. No. 13/441,269, filed Apr. 6, 2012, by Bulan et al., and entitled "A System And Method For Available Parking Space Estimation For Multispace On-Street Parking";

U.S. application Ser. No. 13/461,191, filed May 1, 2012, by Fan et al., entitled "System And Method For Street-Parking-Vehicle Identification Through License Plate Capturing";

U.S. application Ser. No. 13/684,817, filed Nov. 26, 2012, by Rong et al., entitled "System And Method For Estimation Of Available Parking Space Through Intersection Traffic Counting";

http://streetsmarttechnology.com, 2 pages, copyright 2011;

http://www.alibaba.com/product-gs/373281312/Ultrasonic_Parking_Sensor.html, 3 pages, copyright 1999-2013;

http://en.wikipedia.org/wiki/Hough_transform; 10 pages, Jan. 9, 2013;

http://www.cs.brown.edu/~pff/latent/, version 5, Sep. 5, 2012, 3 pages (http:people.cs.uchicago.edu/~rbg/latent/);

N. Dalal and B. Triggs "Histograms Of Oriented Gradients For Human Detection", in 2005, CVPR, 8 pages;

T. Ojala, M. Pietikäinen, and D. Harwood, "A Comparative Study Of Texture Measures With Classification Based On Feature Distributions", 1996 Pattern Recognition, volume 29, pages 51-59, Department of Electrical Engineering, Oulu, Finland;

M. Nilsson, J. Nordberg, and I. Claesson, "Face Detection Using Local Smqt Features And Split Up Snow Classifier", IEEE International Conference on Acoustics, Speech, and Signal Processing, 2007, Blekinge Institute of Technology, Ronneby, Sweden, pages II-589 to II-592;

F. Perronnin and C. Dance, "Fisher Kernels On Visual Vocabularies For Image Categorization", CVPR, 2007, Xerox Research Centre Europe, Meylan, France, 8 pages;

G. Csurka, C. Dance, J. Willamowski, L. Fan and C. Bray, "Visual Categorization With Bags Of Keypoints", ECCV SLCV, 2004, 16 pages;

F. Perronnin, J. Sanchez and T. Mensink, "Improving The Fisher Kernel For Large-Scale Image Classification", ECCV, 2010, Xerox Research Centre Europe, 14 pages;

A. Neubeck and L. V. God, "Efficient Non-Maximum Suppression", ICPR, 2006, Computer Vision Lab, Zurich, Switzerland, 6 pages;

P. Felzenszwalb, R. Girshick, D. McAllester, D. Ramanan, "Object Detection With Discriminatively Trained Part-Based Models," IEEE Transactions on Pattern Analysis and Machine Intelligence, Vol. 32, No. 9, September 2010, pages 1627-1645; and Constantine Papageorgiou and Tomaso Poggio, "A Trainable System For Object Detection", International Journal of Computer Vision, 38(1), pages 15-33, 2000, Netherlands; are incorporated herein by reference in their entirety.

BRIEF DESCRIPTION

In one embodiment of this disclosure, described is a computer implemented method of detecting a vehicle in a video frame, the video frame acquired from a fixed parking occupancy video camera including a field of view associated with a vehicle parking region, the method comprising a) capturing a video frame from the fixed parking occupancy video camera, the video frame including a ROI (Region of Interest) oriented by an orientation angle relative to an orientation of an image plane associated with the captured video frame, the ROI including one or more parking spaces of the vehicle parking region; b) rotating the ROI by the orientation angle of the ROI; and c) performing a sliding window-based 2-D (Dimensional) space search for a vehicle within the rotated ROI, the sliding window-based 2-D space search extracting one or more features associated with each of a plurality of windows and accessing a classifier to classify each window as including a vehicle or not including a vehicle.

In another embodiment of this disclosure, described is a vehicle detection system associated with a vehicle parking region, the vehicle detection system comprising a parking occupancy video camera directed towards the vehicle parking region; and a controller operatively associated with the parking occupancy video camera, the controller configured to execute computer instructions to perform a process of detecting a vehicle in a video frame including a) capturing a video frame from the parking occupancy video camera, the video frame including a ROI (Region of Interest) orientated by an orientation angle, relative to an orientation of an image plane associated with the captured video frame, the ROI including one or more parking spaces of the vehicle parking region; b) rotating the ROI by the orientation angle of the ROI; and c) performing a sliding window-based 2-D (Dimensional) space search for a vehicle within the rotated ROI, the sliding window-based 2-D space search extracting one or more features associated with each of a plurality of windows and accessing a classifier to classify each window as including a vehicle or not including a vehicle.

In still another embodiment of this disclosure, described is a computer implemented method of determining parking occupancy associated with a vehicle parking region comprising a) capturing a video frame from a parking occupancy video camera directed towards the vehicle parking region; b) rotating the captured video frame by a predetermined orientation angle of a longitudinal axis associated with a ROI (Region of Interest) associated with the captured video frame, relative to an orientation of an axis associated with an image plane associated with the captured video frame, the ROI including one or more parking spaces of the parking region; and c) performing a sliding window-based 2-D (Dimensional) space search for a vehicle within the ROI associated with the rotated captured video frame, the sliding window-based 2-D space search extracting one or more features associated with each of a plurality of windows and accessing a classifier to classify each window as including a vehicle or not including a vehicle.

In yet another embodiment of this disclosure, described is a computer implemented method of detecting a vehicle in a video frame, the video frame acquired from a fixed parking occupancy video camera including a field of view associated with a vehicle parking region, the method comprising a) capturing a video frame from the fixed parking occupancy video camera, the video frame including a ROI (Region of Interest) oriented by an orientation angle relative to an orientation of an image plane associated with the captured video frame, the ROI including one or more parking spaces of the vehicle parking region; and b) performing a sliding window-based 2-D (Dimensional) Space Search for a vehicle with the ROI, the sliding window-based 2-D space search extracting one or more features associated with each of a plurality of windows and accessing a classifier to classify each window as including a vehicle or not including a vehicle, wherein step b) performs the sliding window-based 2-D space search along an orientation axis of the ROI associated with the orientation angle of the ROI relative to the orientation of the image plane.

DETAILED DESCRIPTION

Figure 1:
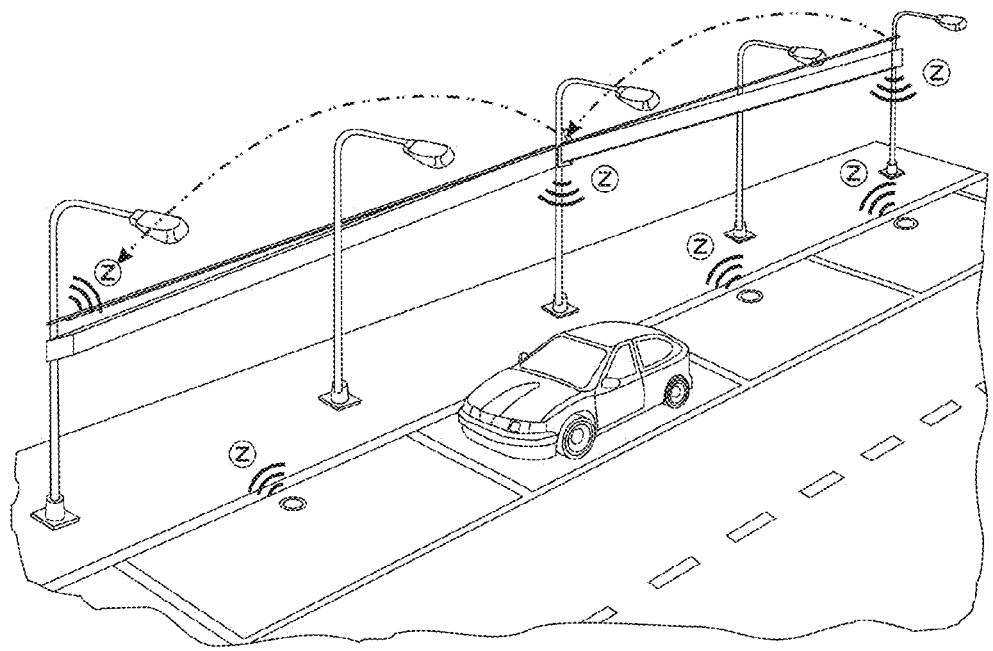
FIG. 1 shows a "puck-style" sensor-based method for detecting parking space occupancy according to the PRIOR ART.
Figure 2:
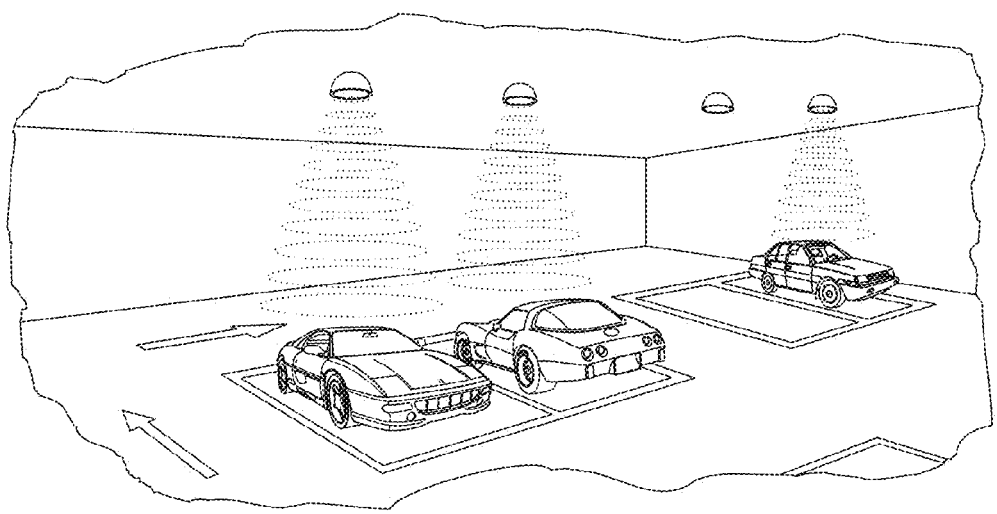
FIG. 2 shows an ultrasonic sensor-based method for detecting parking space occupancy according to the PRIOR ART.
Figure 3:
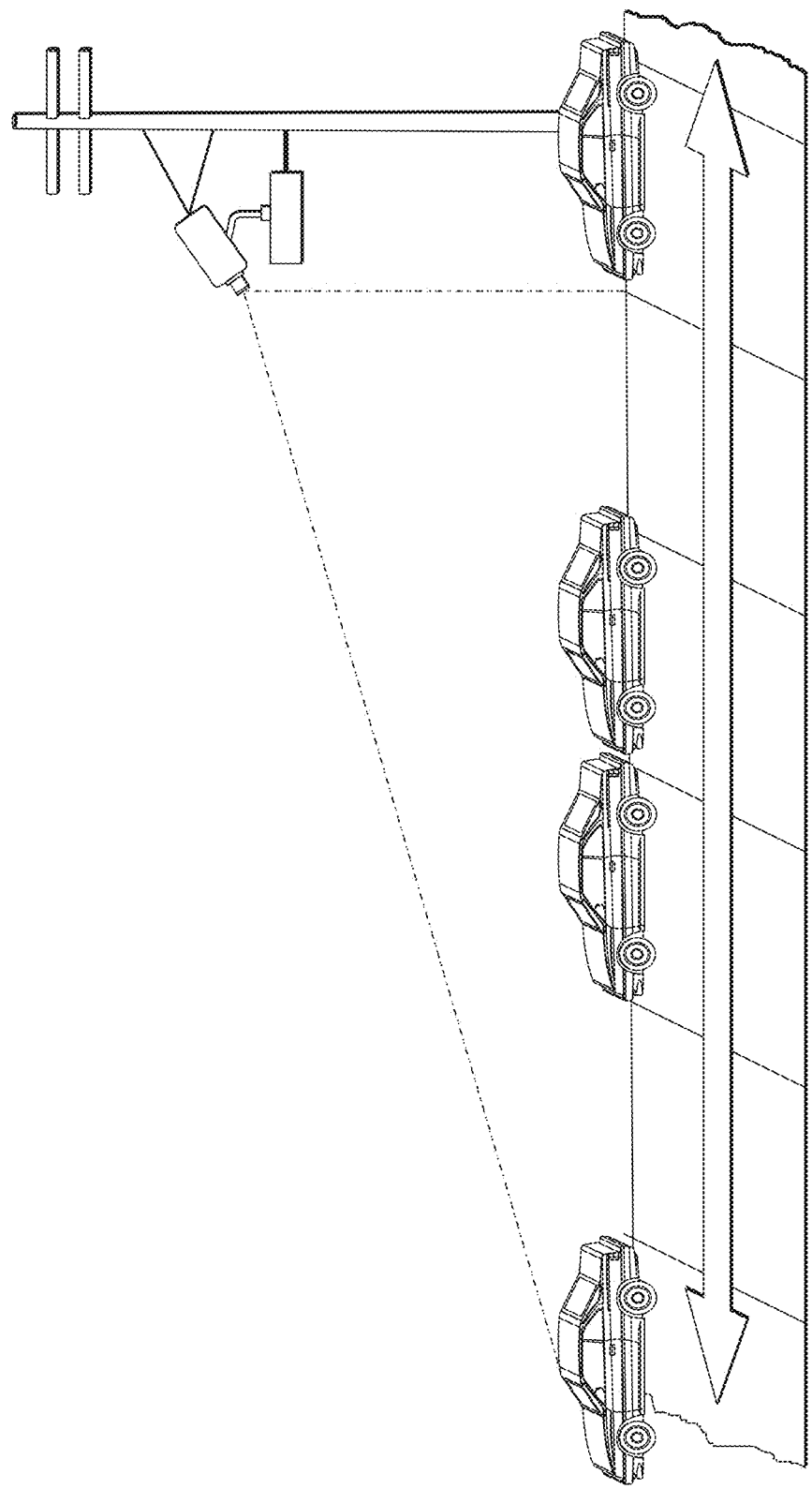
FIG. 3 shows a video-based method for detecting parking space occupancy according to the PRIOR ART.
Figure 4:
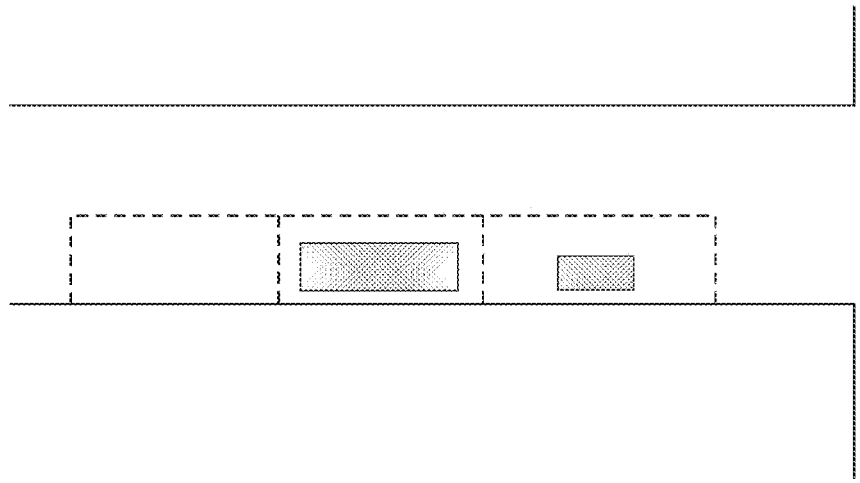
FIG. 4 shows a single-space parking configuration.
Figure 5:
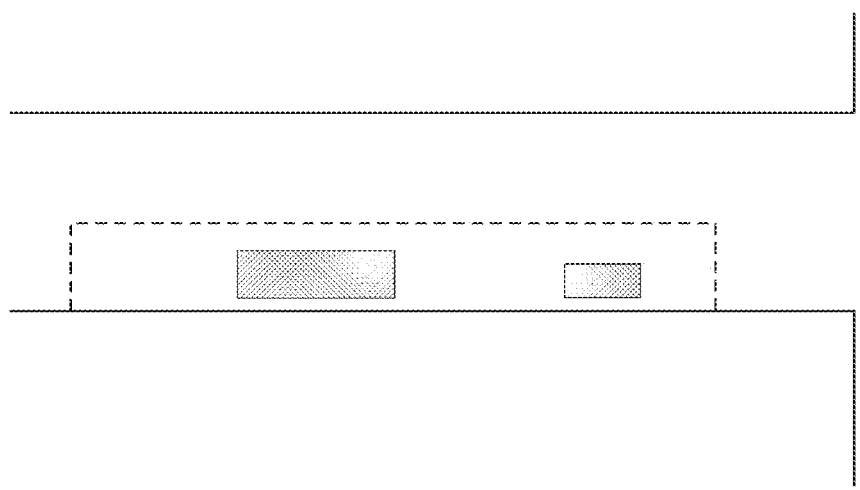
FIG. 5 show a multiple-space parking configuration.
Figure 6:
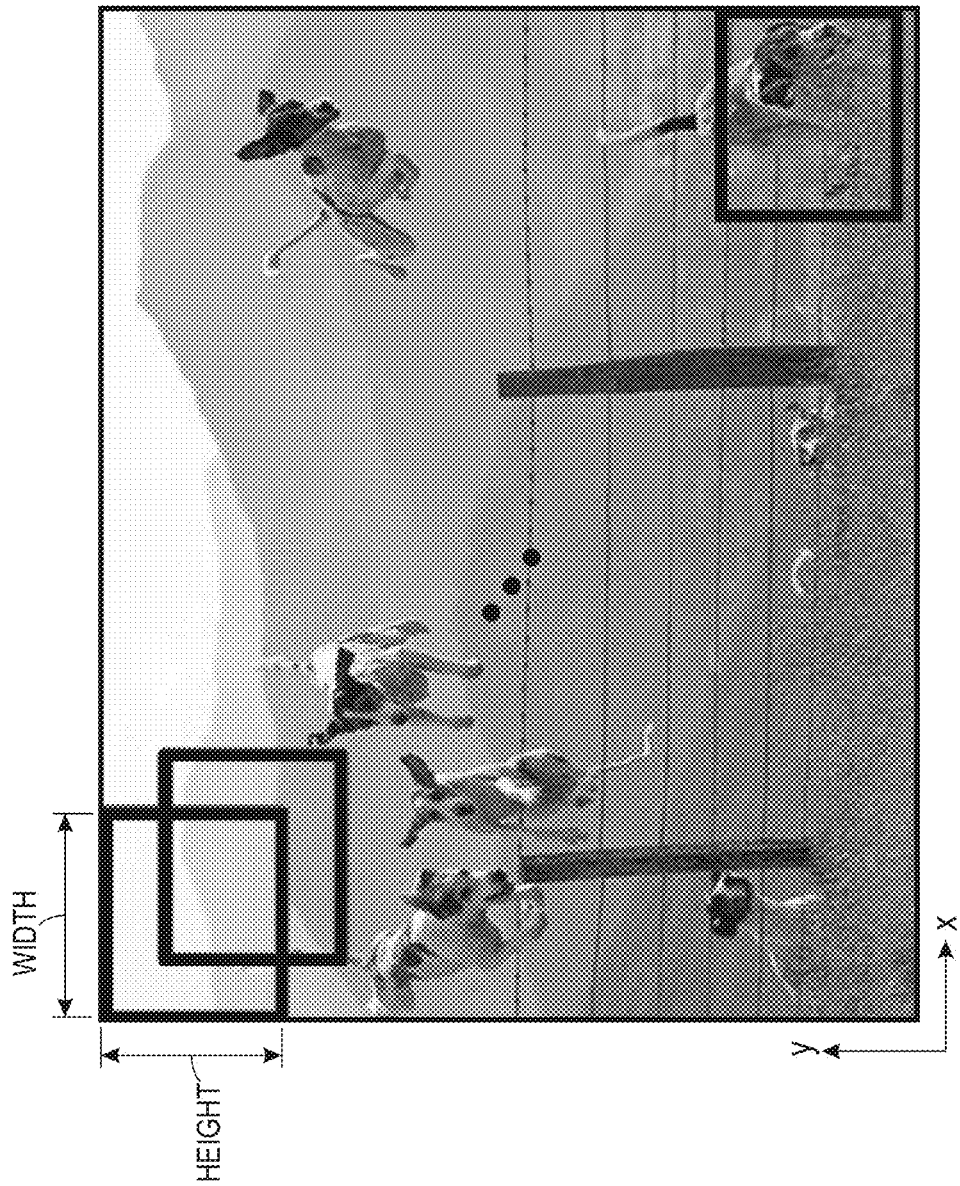
FIG. 6 illustrates a sliding window search for object detection, the search space being 4 dimensional, i.e. x-direction, y-direction, window height and window width.

This disclosure provides a computationally efficient vision-based vehicle detection method and system from images acquired with fixed cameras operatively associated with a parking occupancy management system. As shown in FIG. 6, object localization algorithms typically implement a 4-D (Dimensional) sliding window search approach in which both the location (x and y) and the size (height and width) of the window are changed, and where the candidate window(s) yielding the best classification score are kept. This is a computationally expensive approach because optimization is performed on a four-dimensional (4-D) space. This disclosure provides improved efficiency by exploiting a priori knowledge of a camera and scene geometry, and searching across a reduced feasible candidate set, or region of interest (ROI). Since the height of an ROI is known, which coincides with the height of a feasible parking region, searches only need to be performed across horizontal locations within the ROI and across an object length, i.e. vehicle, length. A mapping of the ROI to rectangular coordinates is achieved by rotating the ROI by the angle of a longitudinal axis associated with the ROI, such as but not limited to a curb relative a reference image plane associated with the captured video. Benefits of the disclosed method/systems include an increase in computational efficiency with no loss in performance. In addition, the disclosed vehicle detection method and system is robust to variations in the way an ROI is cropped/selected. According to one exemplary embodiment, manual intervention is used for each camera deployed, as the ROI is specific to the geometry of the camera. However, as disclosed in copending patent application Ser. No. 13/836,310, filed Mar. 15, 2013, entitled "Methods and System for Automated In-Field Hierarchical Training of a Vehicle Detection System", by Wu et al., an automatic hierarchical approach provides a manner of automatically deploying multiple camera systems, whereby no manual intervention, or minimal manual intervention is required.

Video-based parking occupancy detection systems have been proposed in the literature to provide real-time parking occupancy data to drivers to reduce fuel consumption and traffic congestion, see U.S. Pat. No. 6,285,297 by Jay H. Ball, issued Sep. 4, 2001, entitled "Determining the availability of parking spaces" and U.S. application Ser. No. 13/441,269, Filed Apr. 6, 2012, by Bulan et al., entitled "A System and Method For Available Parking Space Estimation For Multi-space On-Street Parking". An important step in these video-based parking systems is localizing a parked vehicle within a region of interest as quickly as possible to enable real-time processing for the overall system. As briefly discussed above, existing search algorithms for the purpose of object detection, i.e. vehicle detection, typically perform a sliding window search in 4-D space, i.e., x-direction, y-direction, and window size (height and width) as shown in FIG. 6, and are relatively inefficient for specialized applications where the video cameras are fixed. In the FIG. 6, the object of interest is a dog and a fixed size window is sliding across the image, i.e. along x and y directions. This search will locate dogs that fit in the selected window size such as the one at the right lower corner. In order to locate all dogs of different sizes in the image, the search is repeated for various window sizes, by varying the window height and width. Alternatively, the search can be performed with a fixed window size on sub-sampled images to account for different object sizes. In any case, this search process is computationally expensive as the search space for localizing an object is 4-dimensional, i.e., x-direction, y-direction, sliding window height and window width. This process can be especially cumbersome for locating vehicles in a video-based parking occupancy detection system as the size of vehicles in a region of interest associated with the parking region may vary. This disclosure provides a fast and efficient method/system for localization of parked vehicles within a region of interest in a still image/video frame from a fixed camera. Unlike the conventional search algorithms for object detection, the provided method and system performs vehicle searching in 2-D space instead of 4-D, or alternatively, in a 3-D space.

According to an exemplary method, fast and efficient localization of vehicles within a region of interest (ROI) associated with an on-street, i.e. curb parking region. A still image/video frame including the parking region is provided where a camera and ROI within a field of view associated with the camera are fixed. The method includes two phases: 1) offline (training) phase, and 2) online phase. In one exemplary embodiment of the disclosed method, the offline (training) phase includes, a) Capturing video from a parking occupancy camera; b) Defining an ROI corresponding to the parking region in the captured video; c) Determining the orientation angle of the parking region relative to an image plane associated with the captured video and rotating the captured image by the determined orientation angle; d) Carving out the ROI in the rotated image plane and extracting positive samples (vehicle) and negative samples (nonvehicle) from the carved out region; and e) Extracting a set of features from the positive and negative samples and training a classifier using the extracted features and class labels for each sample. During the online phase of the embodiment, the following steps are performed; f) Acquiring an image/video frame from the camera; g) Rotating the acquired image by the orientation angle associated with the orientation angle determined in the offline phase; h) Carving out the ROI in the rotated image plane; i) Performing a window-based search within the carved out region along the x-direction at various window widths, i.e. 2-D sliding window search; j) Extracting one or more features for each window and inputting the extracted features into the trained classifier generated during the offline phase to classify each window as "vehicle" or "nonvehicle"; and k) Suppressing overlapping "vehicle" windows that correspond to the same vehicle.

It is to be understood that while the disclosed embodiments primarily describe rotating a ROI/captured image associated with a parking region, alternatively, 2-D searching may be performed along an axis parallel to the orientation of the ROI/captured image relative to the image plane, without rotating the ROI/captured image.

Figure 7:
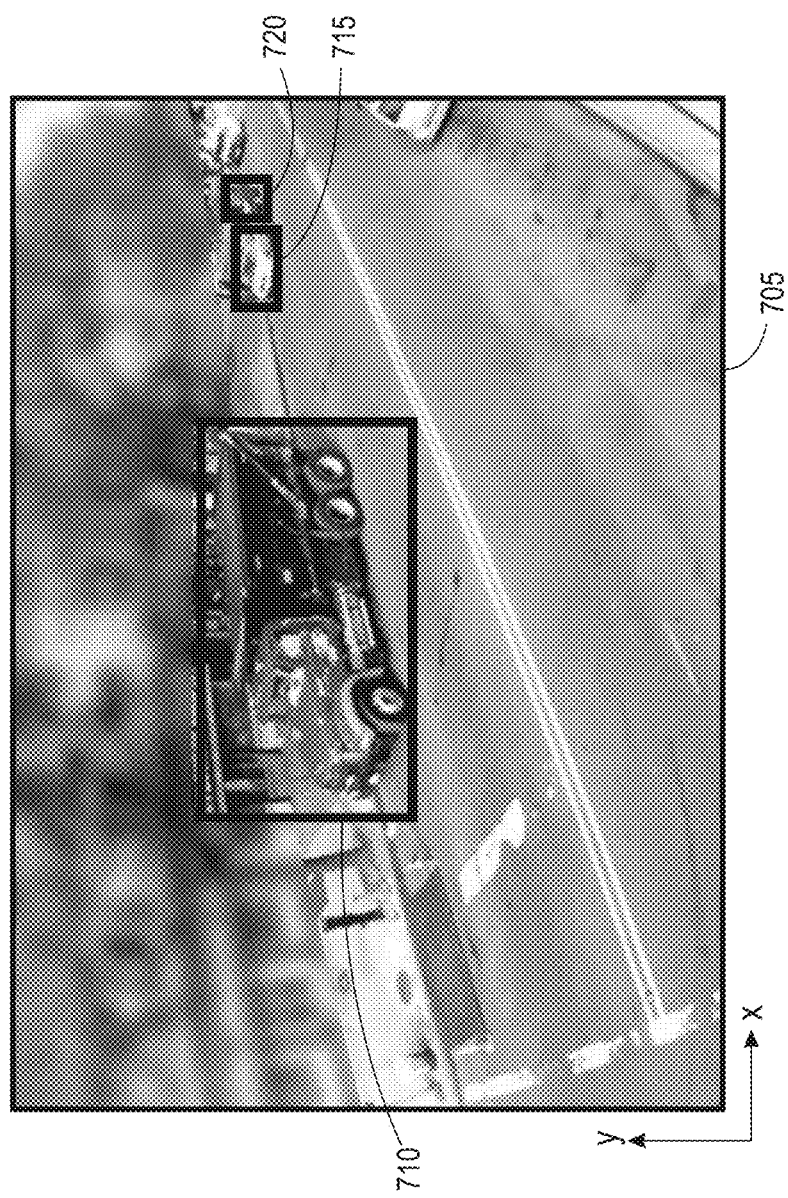
FIG. 7 illustrates a captured video frame including vehicles of different sizes in the field of view of a parking occupancy camera associated with a city block.

FIG. 7 shows field of view of a camera installed on a city block. As FIG. 7 shows, the size, i.e., height and width, and aspect ratio of the vehicles 710, 715, 720 in the parking region varies significantly. Notably, the reason for different size of vehicles on the image plane 705 is twofold: 1) Physical sizes of different types of vehicles, i.e., height and length, vary (e.g., motorcycle vs. truck). In addition, 2) objects that are closer to a fixed camera appear larger on the image plan 705. In order to locate all vehicles of different sizes in a parking region, conventional sliding-window based object detection algorithms require searching all windows from a smallest size to a largest size, i.e., by varying height and width of search window, along x and y directions in a determined region of interest, which is computationally expensive.

For a video-based parking occupancy application, the processing time of the overall system should be real-time to provide relevant parking data to inform drivers of the parking occupancy status of a particular parking region. Importantly, vehicle localization may be a single module within an entire video-processing algorithm and vehicle localization constitutes the computationally most expensive portion of the overall processing of the system. It is, therefore, highly desirable to perform vehicle localization in a fast and efficient manner to enable real-time processing for the overall system.

As briefly discussed above, the method and system disclosed herein is composed of two phases, 1) offline (training) phase, and 2) online phase. Described now are further details of the vehicle detection method and system to facilitate a better understanding.

According to one exemplary embodiment of the disclosed method, the offline (training) phase includes the following steps:

a) Capture video from a parking occupancy camera;

b) Define a region of interest corresponding to parking region in the captured video;

c) Determine the orientation angle of the parking region on the image plane and rotating the image with the angle determined;

d) Carve out the region of interest in the rotated image plane and extracting positive samples (vehicle) and negative samples (nonvehicle) from the carved out region; and e) Extract a set of features from positive and negative samples and training a classifier using the extracted features and the class labels for each sample.

The offline process may be performed at the camera installation/set-up. Once the video cameras are set-up and the offline processing is completed, vehicles can be localized in each frame using the trained classifier. This is what is referred to as the online phase. During the online phase of the exemplary embodiment, the following steps are performed:

f) Acquire an image/video frame from the camera;

g) Rotate the image with the angle determined in the offline phase;

h) Carve out the region of interest in the rotated image plane;

i) Perform a window-based search within the carved out region along x-direction for various window width;

j) Extract a set of features for each window and feeding them into the classifier to classify each window as "vehicle" or "nonvehicle"; and k) Suppress overlapping "vehicle" windows that correspond to the same vehicle.

Details of the Offline (Training) Phase.

Figure 8:
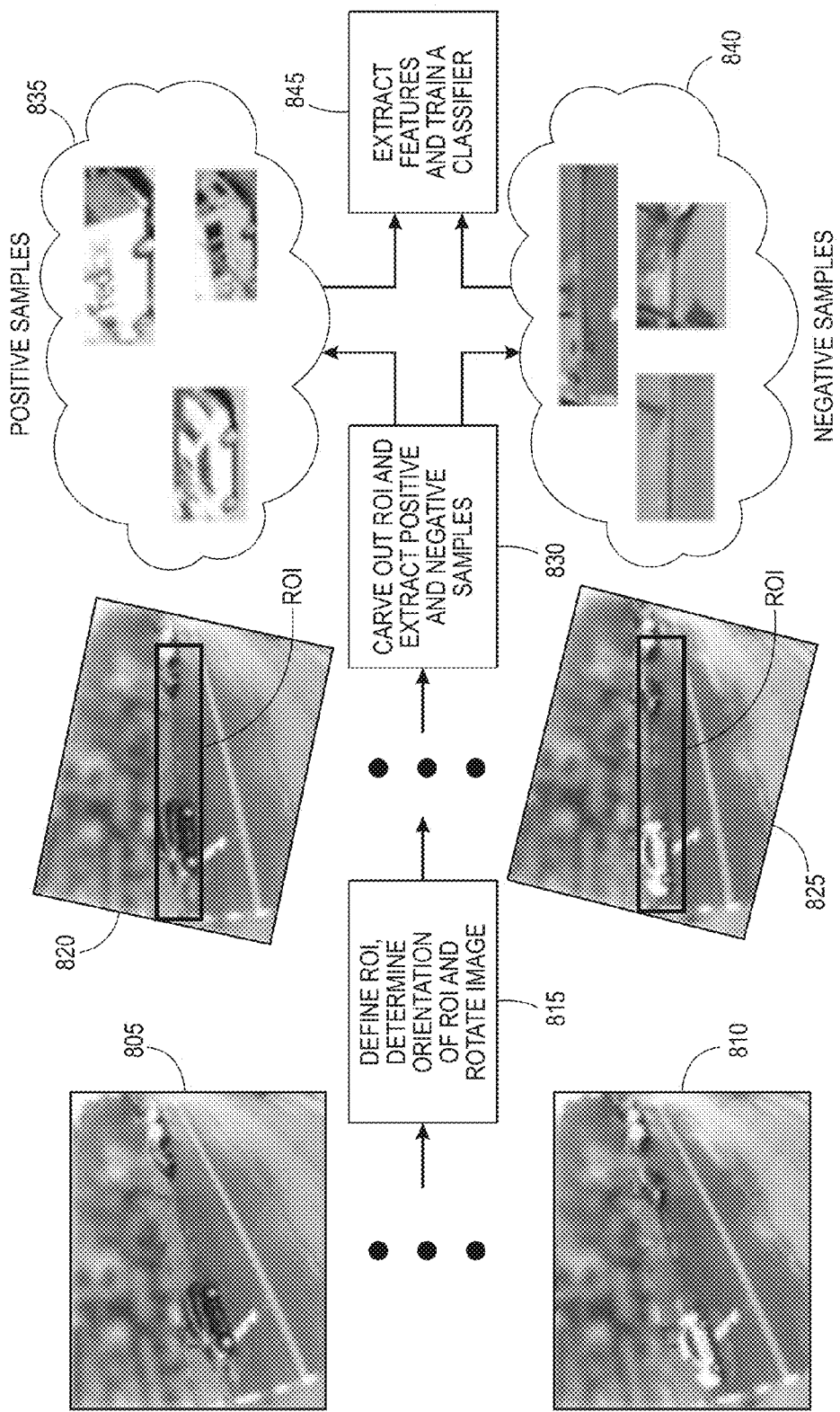
FIG. 8 is a flow chart of an offline training method associated with a vehicle detection method according to an exemplary embodiment of this disclosure.

FIG. 8 shows a high level overview of the offline (training) phase illustrating the individual steps performed. Described below is each step in further detail.

a) Capture video from a parking occupancy camera, 805-810.

One or more video frames are captured from a fixed camera that monitors a parking region of interest. The length of the captured video depends on the level of activity in the parking region to gather enough training samples. For low activity parking regions, video acquired over a relatively longer time frame may be required. If monitoring at night is desired, NIR (near infrared) cameras may be beneficial, and/or the use of external illumination sources. Relatively inexpensive NIR cameras are readily available, as the low-end portion of the near-infrared spectrum, i.e. 700 nm-1000 nm, can be captured with equipment that is designed to capture visible light.

b) Defining a region of interest (ROI) corresponding to the parking region in the captured video, 815.

The location of the parking region on the image plane associated with the captured video depends on the geometric configuration of the camera set-up and can be specified manually at camera set-up/installation. For example, the parking region may be specified by a polygon, an ellipse or any other closed geometric shape. The region of interest within the image plane may be defined based on a typical passenger car size, where the ROI includes complete coverage or partial coverage of the typical passenger car in the parking region, while not including much of the background region nor including a vehicle when a vehicle is parked in the region.

c) Determine the orientation angle of the parking region relative to the image plane and rotating the captured image by the orientation angle determined, 815.

Once the parking region is defined with respect to the image plane, the orientation angle of the parking region can be defined by specifying two points in the parking region as the start and end points. These two points, for example, can be the left-bottom and right-bottom points of the region of interest, i.e. parking region, on the image plane. The orientation angle from these points may be calculated as:

$$\theta = \operatorname{atan}\left(\frac{y_2 - y_1}{x_2 - x_1}\right)$$

where $\theta$ is the orientation angle of the parking region on the image plane and $(x_1, y_1)$ and $(x_2, y_2)$ are the coordinate locations of the start and end points of the parking region, respectively. Alternatively, the orientation angle of the parking region may be determined from a curb angle associated with the captured video. Curb angle may be estimated automatically by, for example, finding the longest line in the region of interest using an algorithm like a Hough transform on the edge map of a static scene, see http://en.wikipedia.org/wiki/Hough_transform, and calculating the angle of this line. This line detection can preferably be performed using multiple frames at time instants when there is no motion detected in the scene. Another way to estimate curb angle is by using an activity map that shows the regions where motion occurs the most. The most active region in the activity map will be oriented in the direction of the traffic which typically runs parallel to the curb.

After the orientation of the parking region is determined, the image/video frame, 805-810, is rotated by the determined orientation angle. The rotated image/video frame aligns the region of interest along the horizontal direction as shown in FIGS. 8, 820 and 825.

d) Carve out the region of interest in the rotated image frame and extract positive samples (vehicle) and negative samples (nonvehicle) from the carved out region, i.e. ROI, 830.

After the captured image is rotated, the region of interest is carved out from the image. Positive (vehicle) 835 and negative (nonvehicle) 840 samples are then extracted from the carved out region, i.e., parking region. These samples may be extracted either manually from the carved out region or automatically using a hierarchical training approach as described in copending patent application by Wu et al. "Automated In-Field Hierarchical Training of Vehicle Detector For General Deployment of Vehicle Detection Cameras.

Figure 9:
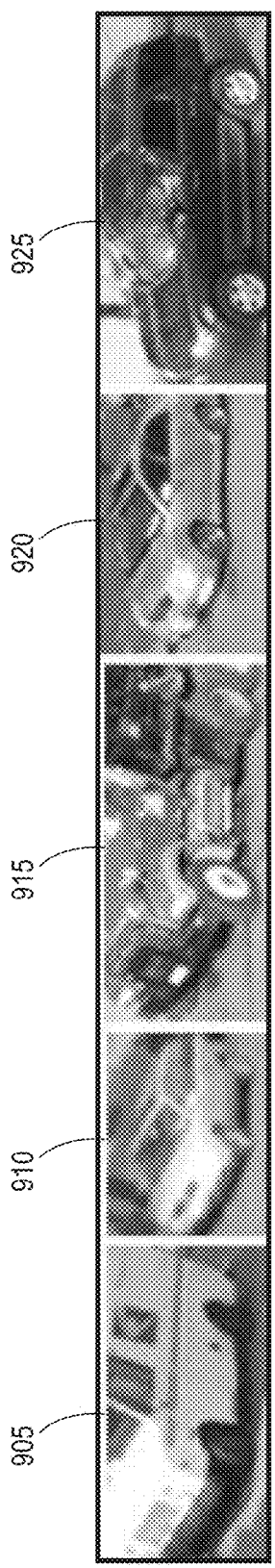
FIG. 9 is a set of positive samples extracted from a region of interest according to an exemplary embodiment of this disclosure.
Figure 10:
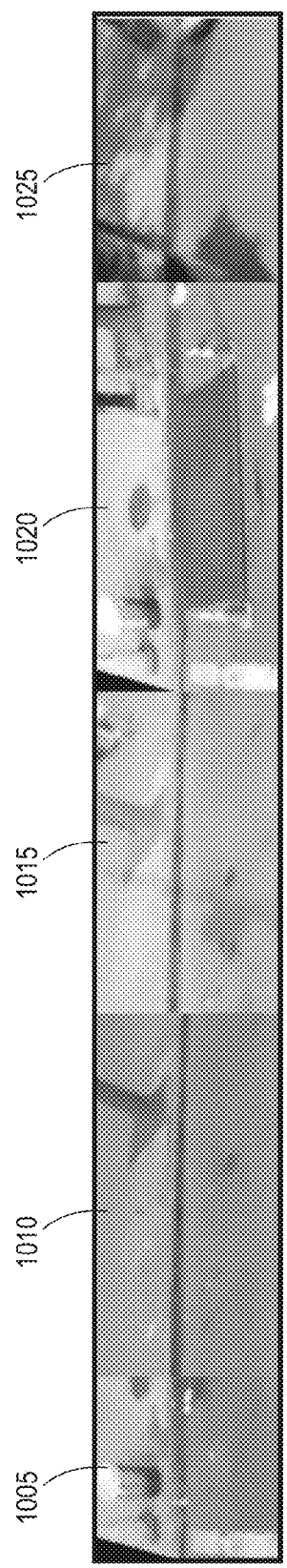
FIG. 10 is a set of negative samples extracted from a region of interest according to an exemplary embodiment of this disclosure.

FIGS. 9 and 10 show a set of positive 1005, 1010, 1015, 1020, 1025 and negative 905, 910, 915, 920, 925 samples extracted from the carved out region, respectively. Note that in step b of the offline phase, the region of interest, i.e., parking region, on the image plane is typically defined by the size of a passenger car to cover it fully in the region. This ensures that when a positive sample is extracted from the carved out region, it mostly includes car video in the extracted patch of video rather than the background of the video, i.e. buildings, pedestrians, etc. In the event a large vehicle, e.g., a truck, parks in the region, a portion of the vehicle, i.e. the upper portion, may be cropped out of the region of interest as shown in FIG. 9. This however, is not an issue for parking occupancy detection applications according to this disclosure because vehicle height is not a concern for the expected vehicle profiles.

In contrast to conventional vision-based object detection, i.e. vehicle detection, methods where training samples contain the entire object with little or no background, the disclosed method includes variable amounts of background depending on the region of interest, the vehicle size, and its location on the street. In essence, the classifier is trained to recognize/detect vehicles through a pre-defined mask with a distorted camera view. It is this variant that enables reducing a typical 4-D search (x-direction, y-direction, object height, object length) to a 2-D search (x-direction and object length). Furthermore, since parked vehicles tend to have consistent relative positions relative to the street curb, the disclosed method does not suffer from accuracy degradation by including such variable amounts of background.

e) Extract a set of features from positive and negative samples and training a classifier using the extracted features and the class labels for each sample, 845.

After a sufficient set of positive samples and negative samples are collected, a classifier may be trained using a manual and/or a machine learning approach. The machine learning approach is achieved by initially extracting a set of features from the collected samples. These features may be extracted in a variety of ways including the following:

Dimensionality reduction techniques such as principal component analysis (PCA) or linear discriminant analysis (LDA).

Texture based features such as histogram of oriented gradients (HOG), see N. Dalai and B. Triggs "Histograms of Oriented Gradients for Human Detection", in 2005 CVPR, local binary patterns (LBP) and T. Ojala, M. Pietikäinen, and D. Harwood, "A Comparative Study of Texture Measures with Classification Based on Feature Distributions", 1996 Pattern Recognition, vol. 29, pp. 51-59, or successive mean quantization transform features (SMQT), see M. Nilsson, J. Nordberg, and I. Claesson, "Face Detection using local SMQT Features and Split Up SNoW Classifier", IEEE International Conference on Acoustics, Speech, and Signal Processing, 2007.

Features based on color attributes (e.g., color histogram).

Scale invariant features such as scale invariant feature transform (SIFT) features or speeded up robust features (SURF).

Local image descriptors such as bag of visual words (BOW), see G. Csurka, C. Dance, J. Willamowski, L. Fan and C. Bray, "Visual categorization with bags of keypoints", ECCV SLCV, 2004, or Fisher vectors, see F. Perronnin and C. Dance, "Fisher kernels on visual vocabularies for image categorization", CVPR, 2007 and F. Perronnin, J. Sanchez and T. Mensink, "Improving the Fisher kernel for large-scale image classification", ECCV, 2010.

Any combination of the features listed above may be used to provide a final feature vector. A linear/non-linear classifier, such as a linear Support Vector Machine (SVM), may then be trained by feeding the features extracted from the set of training samples and the class labels, i.e. vehicle and non-vehicle, of the training samples, i.e. an indication of positive or negative for each training sample, to the classifier.

It is to be understood that while the disclosed embodiments use a two class classifier, i.e. vehicle and non-vehicle, it is within the scope of this disclosure to train a classifier with three or more classifications, such as type 1 vehicle, type 2 vehicle, non-vehicle, etc., where a plurality of "positive" sample types would be used, and possibly a plurality of "negative" sample types.

Details of the Online Phase.

Figure 11:
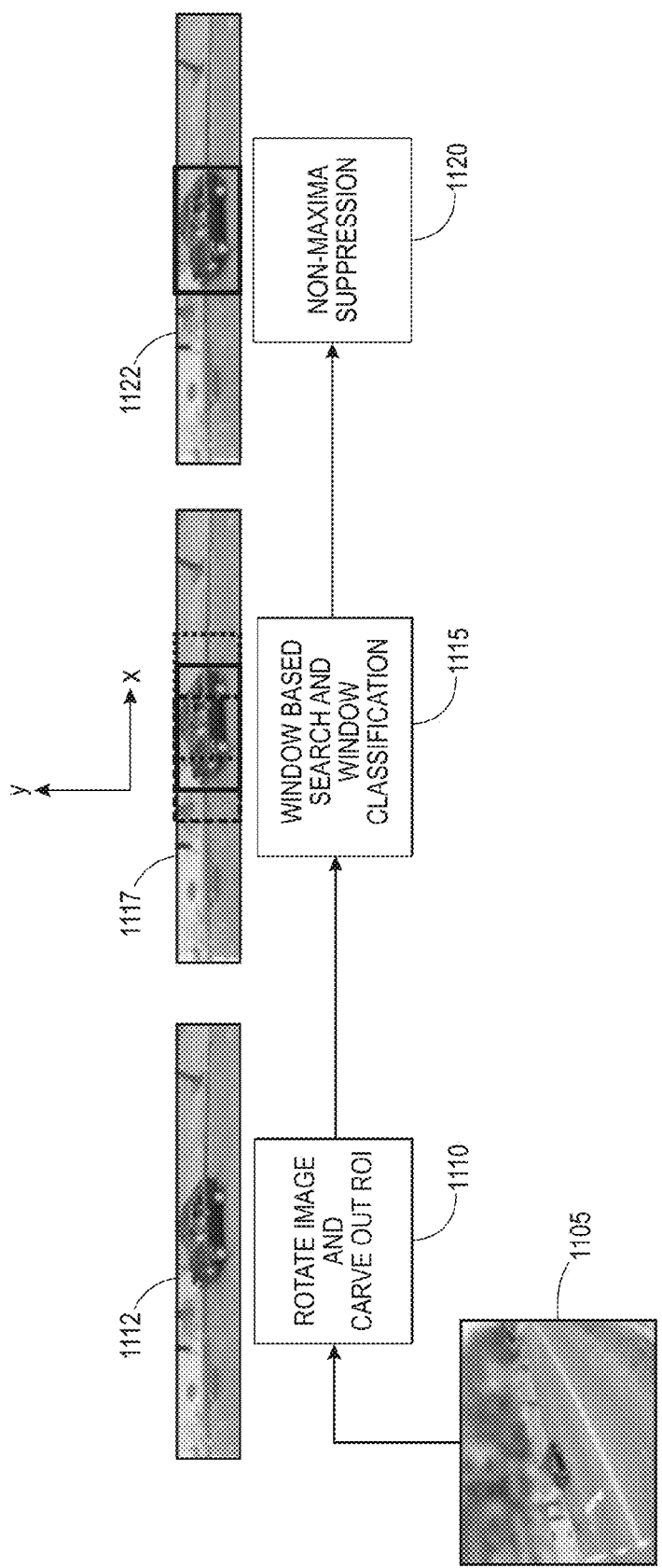
FIG. 11 is a flow chart of an online vehicle detection method according to an exemplary embodiment of this disclosure.

FIG. 11 shows a high level overview of the online phase. Described below is each step in further detail.

f) Acquire an image/video frame 1105 from the video camera.

Once the offline processing is completed, the online phase begins by acquiring images/video frames from the same camera used to monitor the region of interest for the offline phase.

g) Rotate the acquired image by the orientation angle determined in the offline phase, 1110.

The Acquired image 1105 is rotated by the orientation angle determined in the offline phase.

h) Carve out the region of interest in the rotated image plane.

After rotating the image, the region of interest is carved out from the rotated image as shown in FIG. 11, 1112.

i) Perform a window-based search within the carved out region along the x-direction for various window widths, 1115.

Figure 12:
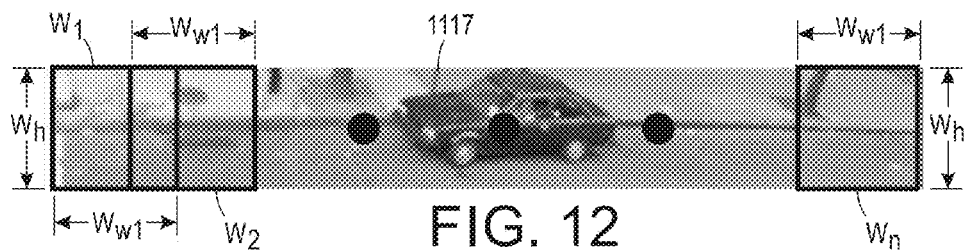
FIGS. 12, 13 and 14 illustrate a sliding window search in 2-D in a region of interest according to an exemplary embodiment of this disclosure.
Figure 13:
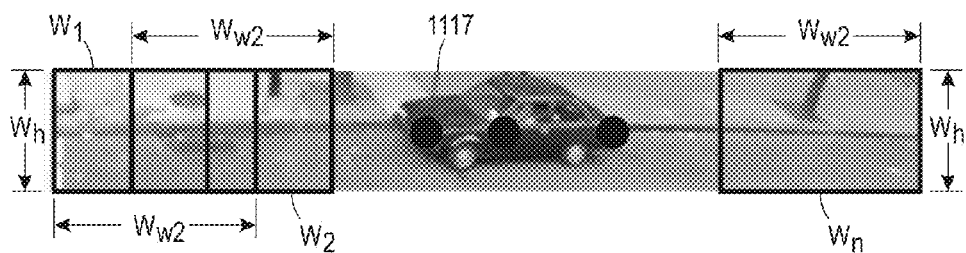
Figure 14:
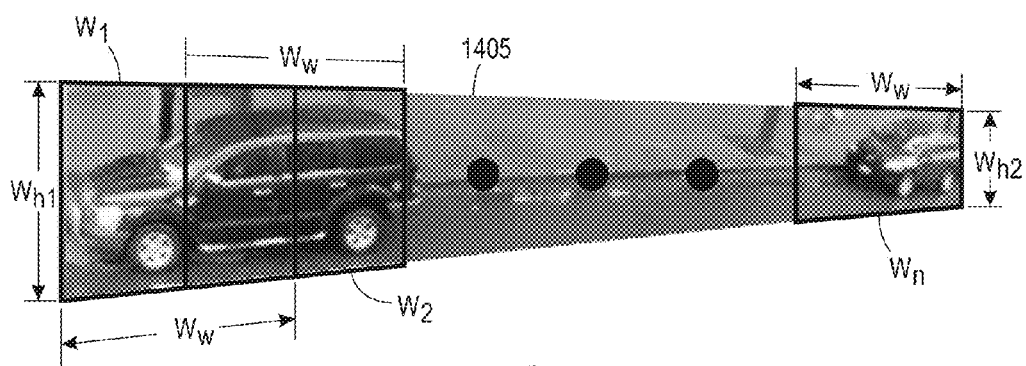

A sliding window search is performed within the carved out region. The advantage(s) of the disclosed method and system is provided by the performance of this step because the sliding window search 1117 is only performed in 2-D, i.e. along the x-direction by varying the window width, as compared to a 4-D sliding window search as previously described. FIGS. 12, 13 and 14 show exemplary embodiments of a sliding window search in 2-D where a fixed window slides along the horizontal direction. The search is repeated for different window widths to detect vehicles of different length. Note that window height is fixed and the window search is performed only along the x-direction, which enables the search to be performed in 2-D, rather than the conventional 4-D search which is computationally more expensive.

Stated another way, given an M×N image $I(x,y) x \in [1, M]$ & $y \in [1, N]$, a cropped image $I_c(x,y)$ of a typical rectangular search-window for object detection can be specified by 4-parameters $(x_0, y_0, w, h)$, where, a sub-image is a cropped version of $I(x,y)$, i.e.

$$I_c(x,y)=I(x,y) \text{ for all } x \in [x_0, x_0+w] \text{ \& } y \in [y_0, y_0+h].$$

For a 4-D sliding window search, all four parameters $(x_0, y_0, w, h)$ would be varied. That is, according to a 4-D sliding window search, a search will be performed, for example, for:

$x_0=1, 3, 5, \ldots, M-w$, for every fixed $(y_0, w, h)$, i.e. slide the window at a step of 2 pixels in x-direction.

$y_0=1, 3, 5, \ldots, N-h$, for every fixed $(x_0, w, h)$, i.e. slide the window at a step of 2 pixels in y-direction.

$w=40, 50, 60, \ldots$, for every fixed $(x_0, y_0, h)$, i.e. with various widths of theسliding window at the value of 40, 50, 60, ....

$h=20, 30, 40, \ldots$, for every fixed $(x_0, y_0, w)$, i.e. with various heights of the sliding window at the value of 20, 30, 40, ....

For a 2-D sliding window (illustrated in FIGS. 12 and 13), searching is only done for various $(x_0, w)$, while keeping the height of the rectangular mask h and $y_0$, the y-position of the upper-left corner of the rectangular mask, constant.

FIG. 12 illustrates one example of a first iteration of a 2-D sliding window approach including a window size of $W_{w1}$ width and $W_h$ height. The window incrementally slides from position $W_1$ to position $W_n$.

FIG. 13 illustrates one example of a second iteration of the 2-D sliding window approach including a window size $W_{w2}$ width and $W_h$ height, the window incrementally slides from position $W_1$ to position $W_n$, where $W_1$-$W_n$ may or may not be the same $W_1$-$W_n$ positions of FIG. 12.

Notably, FIG. 12 and FIG. 13 illustrate a 2-D sliding window approach according to exemplary embodiments of this disclosure where a fixed camera is directed substantially perpendicular to the longitudinal axis associated with the ROI 1205. In contrast, FIG. 14 illustrates the situation where the fixed camera is directed towards the ROI at a non-perpendicular angle, where the height of vehicles located to the right of the camera is relatively smaller than the height of vehicles near the left of the camera. For the geometric configuration of FIG. 14, a 2-D sliding window search is performed by varying the aspect ratio of the sliding windows $W_1$-$W_n$, thereby generating windows of heights $W_{n1}$-$W_{n2}$. Importantly, the search is still performed along a fixed longitudinal axis, unlike a conventional 4-D sliding window approach.

While the focus of this disclosure is directed to a 2-D sliding window vehicle detection method/system, alternatively, a 3-D sliding window approach is within the scope of the disclosure. While a 3-D sliding window approach is computationally more expensive than a 2-D approach, a 3-D approach is computationally less expensive than a conventional 4-D approach.

One example of a 3-D sliding window vehicle detection method/system includes the geometric configuration of FIG. 14, where the window height and width are varied as the position of the sliding window is incremented along a fixed longitudinal axis associated with the ROI.

j) Extracting a set of features for each window and inputting them to the classifier trained in the offline phase to classify each window.

The same set of features is extracted for each search window as described in step e) of the offline phase. The extracted features of this step are then inputted to the trained classifier to classify each window into one of "vehicle" or "nonvehicle" categories.

k) Suppressing overlapping "vehicle" windows that correspond to the same vehicle.

In most cases, the classifier will detect more than one window classified as a "vehicle" for the same vehicle. This is illustrated in FIG. 11 where three windows are detected as "vehicle" for the vehicle in scene 1117. In order to acquire the window that best fits the vehicle 1122, a well-known method in the literature called "non-maxima suppression" 1120 may be performed on the detected windows. See A. Neubeck and L. V. Gool, "Efficient Non-Maximum Suppression", ICPR, 2006.

In an instantiation of non-maxima suppression, the suppression may be performed based on classification scores. For example, all windows that overlap more than 50% with a higher score window are suppressed.

Figure 15:
FIG. 15 is a sample captured video frame illustrating a field of view of a camera installed on a city block according to an exemplary embodiment of this disclosure.

Note that the provided method and system of this disclosure reduces the search space from 4-D to 2-D and hence, can achieve faster processing compared to conventional sliding window search in 4-D space. Provided below is the detection performance according to an experiment of the provided method. The performance data provided demonstrated the method/system does not compromise detection performance in favor of faster processing. Initially, six days of video of a city block were recorded from 7:30 am to 7:00 pm. The recorded videos had a frame of 5 frames per second (fps) with a resolution of 640×512. FIG. 15 shows the field of view of the camera used to capture the video.

From the captured videos, the parking region was defined on the image plane and the rotation angle was determined from the orientation of the parking region relative to the image plane. The rotation angle was calculated as degrees. From six days of captured video, four of the days were used for the training phase. Training videos were manually reviewed and vehicles distinctly parked were cropped as positive samples for training. For negative samples, about 500 samples were randomly generated by using video processing to get low activity regions or frames, and cropping the background at random positions with sizes similar to the size of a cropped vehicle. From these positive and negative samples, HOG features were calculated. The calculated features, along with the class labels for each sample, were then used to train a linear SVM classifier.

This system was then tested on videos from 2 days of the originally acquired video that were not part of the training days video. Table 1 shows the size of the training set for this manual process and the resulting performance on the 2-day test videos. The disclosed method and system missed only one out of 75 vehicles without detecting any false positive. Note that for this experiment, the vehicle detection performance is directly assessed by running it independent of other video & image processing steps in the overall system so that the results are not confounded by other processing in the entire vision-based parking management system. The assessment was done by running the vehicle detection system on still images extracted from the test video every 20 minutes.

TABLE 1

Detection performance of the disclosed method/system

| Training Set (4-day videos) | | Testing performance (2-day videos) | |
|---|---|---|---|
| No. of positive samples (manual crop) | 407 | True positive | 74/75 (98.7%) |
| No. of negative samples (random crop) | 482 | False positive | 0/75 (0%) |

Provided herein is a method and system for fast localization of vehicles in images/video frames from fixed cameras. Notably, the method and system are described through a specific embodiment to facilitate the teaching of the method and system but the method can be realized in other ways which are within the scope of this disclosure.

Figure 16:
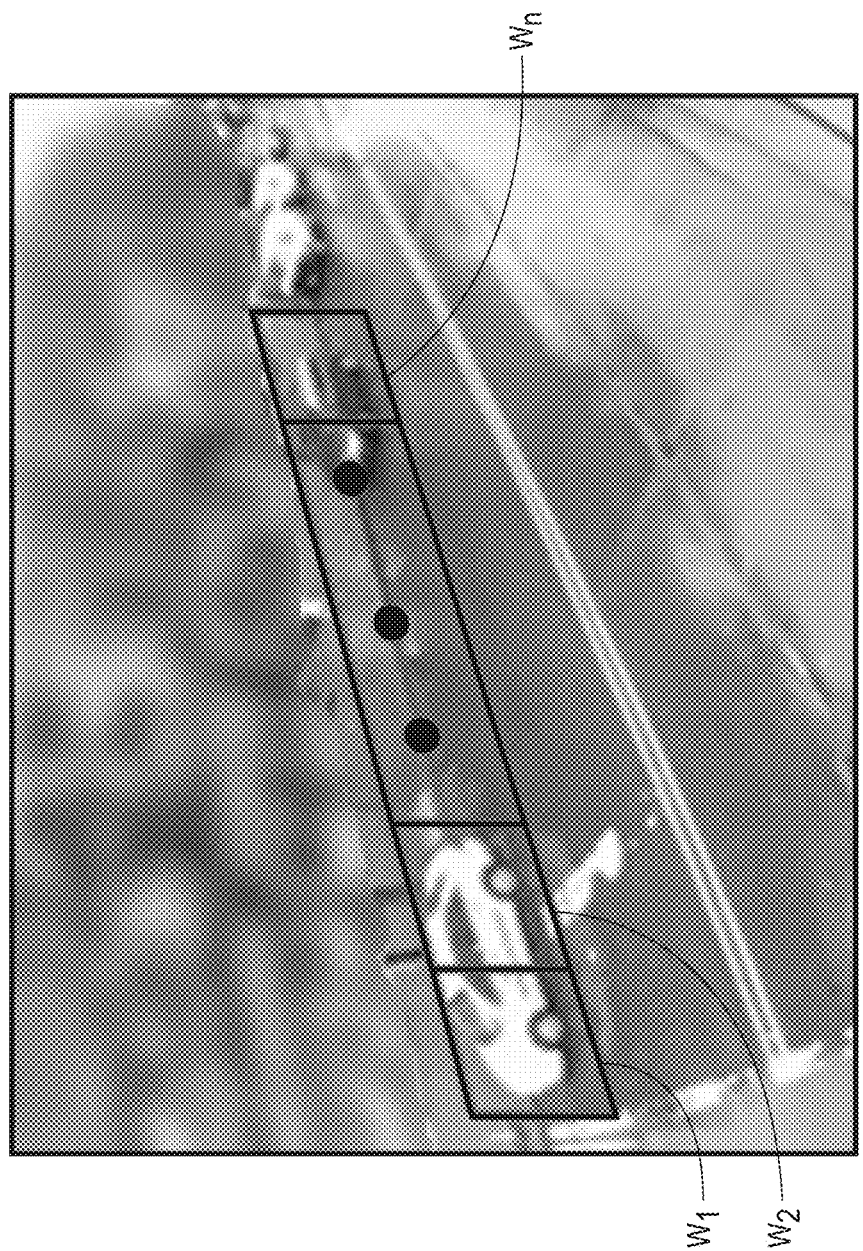
FIG. 16 illustrates a sliding window search along a parallelogram in a region of interest according to an exemplary embodiment of this disclosure.

In another embodiment, for example, the rotation step can be bypassed and a parallelogram can be used to define the region of interest on the image plane. In this case, search windows are parallelograms and they slide across the region of interest as shown in FIG. 16. Note that these changes should apply to both offline and online phases to realize the embodiment. However, the additional rotation step helps normalize the camera views across different camera installation sites and thus enable us to deploy our method to various on-street parking sites more effectively, see Wu et al. "Automated In-Field Hierarchical Training of Vehicle Detector For General Deployment of Vehicle Detection Cameras". Hence it is preferred to have this step from the perspective of general deployments.

The advantage of the provided method is more pronounced when the image/video resolution gets higher to enable additional functionalities (e.g., license plate recognition) for law enforcement or parking payment management. Notable, the 4-D search space for the classical approach will be relatively larger than the 2-D search space and, consequently, the processing time will lag behind the real-time requirement of the overall system.

Figure 17:
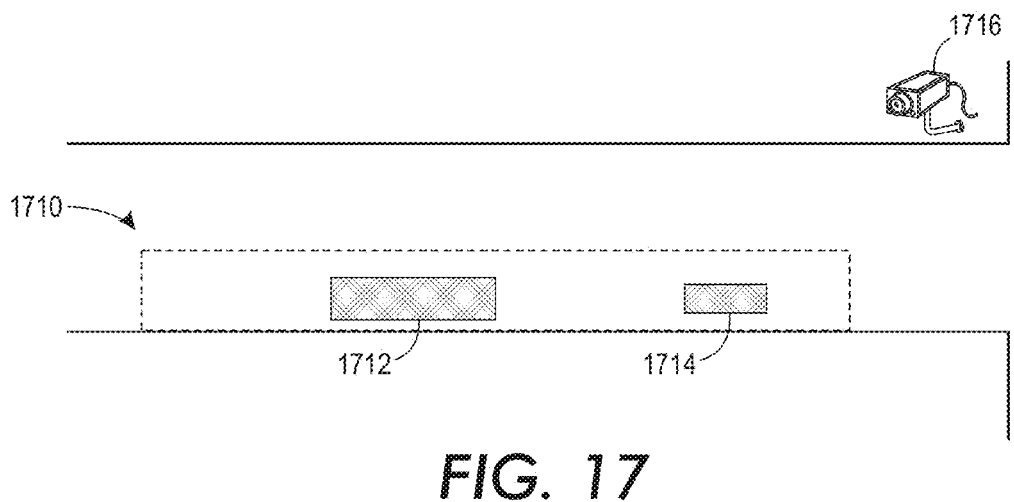
FIG. 17 is one example of a vehicle detection system configuration according to an exemplary embodiment of this disclosure.

With reference to FIG. 17, illustrated is a diagram of the geometric configuration associated with one exemplary embodiment of a vehicle detection system according to this disclosure. The vehicle detection system includes a fixed video camera 1717 and a parking region, i.e. ROI, 1710. The parking region includes parked vehicles 1712 and 1714, but may include more or less parked vehicles.

Figure 18:
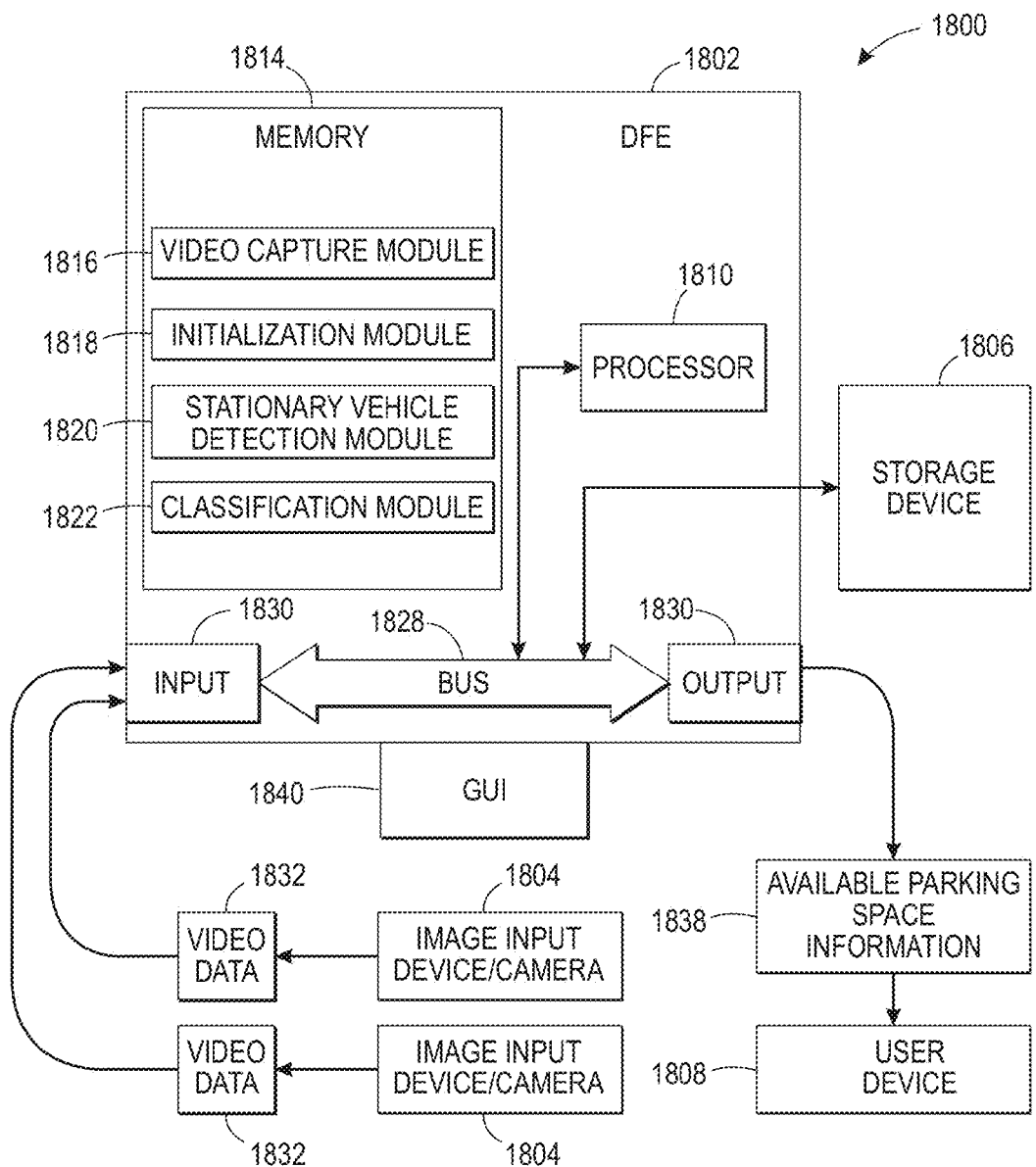
FIG. 18 is a block diagram of a vehicle detection system according to an exemplary embodiment of this disclosure.

FIG. 18 is a schematic illustration of a parking space determination system 1800 according to one exemplary embodiment, the system including a vehicle detection system as described herein. The system includes a determination device 1802, an image capture device 1804, and a storage device 1806, which may be linked together by communication links, referred to herein as a network. In one embodiment, the system 1800 may be in further communication with a user device 1808. These components are described in greater detail below.

The determination device 1802 illustrated in FIG. 18 includes a controller that is part of or associated with the determination device 1802. The exemplary controller is adapted for controlling an analysis of video data received by the system 1800. The controller includes a processor 1810, which controls the overall operation of the determination device 1802 by execution of processing instructions that are stored in memory 1814 connected to the processor 1810.

The memory 1814 may represent any type of tangible computer readable medium such as random access memory (RAM), read only memory (ROM), magnetic disk or tape, optical disk, flash memory, or holographic memory. In one embodiment, the memory 1814 comprises a combination of random access memory and read only memory. The digital processor 1810 can be variously embodied, such as by a single-core processor, a dual-core processor (or more generally by a multiple-core processor), a digital processor and cooperating math coprocessor, a digital controller, or the like. The digital processor, in addition to controlling the operation of the determination device 1802, executes instructions stored in memory 1814 for performing the parts of a method discussed herein. In some embodiments, the processor 1810 and memory 1814 may be combined in a single chip.

The determination device 1802 may be embodied in a networked device, such as the image capture device 1804, although it is also contemplated that the determination device 1802 may be located elsewhere on a network to which the system 1800 is connected, such as on a central server, a networked computer, or the like, or distributed throughout the network or otherwise accessible thereto. The video data analysis, i.e. vehicle detection, phases disclosed herein are performed by the processor 1810 according to the instructions contained in the memory 1814. In particular, the memory 1814 stores a video capture module 1816, which captures video data of a parking area of interest; an initialization module 1818, which initializes the system; and a stationary vehicle detection module 1820, which detects vehicles that are in the parking area of interest; a classification module 1822, which classify whether a ROI includes a vehicle parked in the area of interest. Embodiments are contemplated wherein these instructions can be stored in a single module or as multiple modules embodied in the different devices.

The software modules as used herein, are intended to encompass any collection or set of instructions executable by the determination device 1802 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the determination device 1802 may be all connected by a bus 1828.

With continued reference to FIG. 18, the determination device 1802 also includes one or more communication interfaces 1830, such as network interfaces, for communicating with external devices. The communication interfaces 1830 may include, for example, a modem, a router, a cable, and/or Ethernet port, etc. The communication interfaces 1830 are adapted to receive video and/or image data 1832 as input.

The determination device 1802 may include one or more special purpose or general purpose computing devices, such as a server computer or digital front end (DFE), or any other computing device capable of executing instructions for performing the exemplary method.

FIG. 18 further illustrates the determination device 1802 connected to an image source 1804 for inputting and/or receiving the video data and/or image data (hereinafter collectively referred to as "video data") in electronic format. The image source 1804 may include an image capture device, such as a camera. The image source 1804 can include one or more surveillance cameras that capture video data from the parking area of interest. For performing the method at night in parking areas without external sources of illumination, the cameras 1804 can include near infrared (NIR) capabilities at the low-end portion of a near-infrared spectrum (700 nm-1000 nm).

In one embodiment, the image source 1804 can be a device adapted to relay and/or transmit the video captured by the camera to the determination device 1802. For example, the image source 1804 can include a scanner, a computer, or the like. In another embodiment, the video data 1832 may be input from any suitable source, such as a workstation, a database, a memory storage device, such as a disk, or the like. The image source 1804 is in communication with the controller containing the processor 1810 and memories 1814.

With continued reference to FIG. 18, the system 1800 includes a storage device 1806 that is part of or in communication with the determination device 1802. In a contemplated embodiment, the determination device 1802 can be in communication with a server (not shown) that includes a processing device and memory, such as storage device 1806.

With continued reference to FIG. 18, the video data 1832 undergoes processing by the determination device 1802 to output a determination 1838 regarding parking space availability to an operator in a suitable form on a graphic user interface (GUI) 1840 or to a user device 1808, such as a smart phone belonging to a driver in transit or to vehicle computer and/or GPS system, that is in communication with the determination device 1802. The GUI 1840 can include a display, for displaying information, such as the parking space availability and dimension, to users, and a user input device, such as a keyboard or touch or writable screen, for receiving instructions as input, and/or a cursor control device, such as a mouse, trackball, or the like, for communicating user input information and command selections to the processor 1810.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of detecting a vehicle in a video frame, the video frame acquired from a fixed parking occupancy video camera including a field of view associated with a vehicle parking region, the method comprising:
   a) capturing a video frame from the fixed parking occupancy video camera, the video frame including a ROI (Region of Interest) oriented by an orientation angle relative to an orientation of an image plane associated with the captured video frame, the ROI including one or more parking spaces of the vehicle parking region;
   b) rotating the ROI by the orientation angle of the ROI; and
   c) performing a sliding window-based 2-D (Dimensional) space search for a vehicle within the rotated ROI, the sliding window-based 2-D space search extracting one or more features associated with each of a plurality of windows and accessing a classifier to classify each window as including a vehicle or not including a vehicle.

2. The computer-implemented method of detecting a vehicle according to claim 1, further comprising:
   d) suppressing one or more windows including a common vehicle to eliminate overlapping windows detecting the common vehicle.

3. The computer implemented method of detecting a vehicle according to claim 1, the method comprising:
   performing steps a)-c) for a plurality of captured video frames.

4. The computer implemented method of detecting a vehicle according to claim 1, wherein the ROI is defined by a longitudinal axis, and the orientation angle is defined by the longitudinal axis of the ROI relative to the orientation of an axis associated with the image plane.

5. The computer implemented method of detecting a vehicle according to claim 1, wherein step c) performs the sliding window-based 2-D space search along an x-axis associated with the ROI, at various window widths, while the windows maintain a fixed height.

6. The computer implemented method of detecting a vehicle according to claim 1, wherein step c) performs the sliding window-based 2-D space search along an x-axis associated with the ROI, at various window widths, while a height of the ROI changes relative to a street curb associated with the ROI.

7. The computer implemented method of detecting a vehicle according to claim 1, wherein step c) performs a sliding window-based 3-D space search for a vehicle within the rotated ROI, the sliding window-based 3-D space search performing the search along an x-axis associated with the ROI, at various window widths and various window heights.

8. The computer implemented method of detecting a vehicle according to claim 1, wherein step b) rotates the captured video frame including the ROI, and the ROI is cropped from the captured video frame.

9. The computer implemented method of detecting a vehicle according to claim 1, wherein the ROI is defined as one of a polygon, an ellipse, and a parallelogram shape.

10. The computer implemented method of detecting a vehicle according to claim 1, wherein the classifier is trained with video frames acquired from the fixed parking occupancy video camera.

11. The computer implemented method of detecting a vehicle according to claim 10, wherein the classifier is trained with positive samples of video including a detected vehicle and negative samples of video not including a detected vehicle.

12. The computer implemented method of detecting a vehicle according to claim 11, wherein positive and negative samples are extracted from the rotated ROI for training the classifier.

13. The computer implemented method of detecting a vehicle according to claim 1, wherein the parking region includes one or more of street parking, spot parking and parallel parking.

14. A vehicle detection system associated with a vehicle parking region, the vehicle detection system comprising:
   a parking occupancy video camera directed towards the vehicle parking region; and
   a controller operatively associated with the parking occupancy video camera, the controller configured to execute computer instructions to perform a process of detecting a vehicle in a video frame including:
   a) capturing a video frame from the parking occupancy video camera, the video frame including a ROI (Region of Interest) orientated by an orientation angle, relative to an orientation of an image plane associated with the captured video frame, the ROI including one or more parking spaces of the vehicle parking region;
   b) rotating the ROI by the orientation angle of the ROI; and
   c) performing a sliding window-based 2-D (Dimensional) space search for a vehicle within the rotated ROI, the sliding window-based 2-D space search extracting one or more features associated with each of a plurality of windows and accessing a classifier to classify each window as including a vehicle or not including a vehicle.

15. The vehicle detection system according to claim 14, the process further comprising:
   d) suppressing one or more windows including a common vehicle to eliminate overlapping windows detecting the common vehicle.

16. The vehicle detection system according to claim 14, the process comprising:
   performing steps a)-c) for a plurality of captured video frames.

17. The vehicle detection system according to claim 14, wherein the ROI is defined by a longitudinal axis, and the orientation angle is defined by the longitudinal axis of the ROI relative to the orientation of an axis associated with the image plane.

18. The vehicle detection system according to claim 14, wherein step c) performs the sliding window-based 2-D space search along an x-axis associated with the ROI, at various window widths, while the windows maintain a fixed height.

19. The vehicle detection system according to claim 14, wherein step c) performs the sliding window-based 2-D space search along an x-axis associated with the ROI, at various window widths, while a height of the ROI changes relative to a street curb associated with the ROI.

20. The vehicle detection system according to claim 14, wherein step c) performs a sliding window-based 3-D space search for a vehicle within the rotated ROI, the sliding window-based 3-D space search performing along an x-axis associated with the ROI, at various window widths and various window heights.

21. The vehicle detection system according to claim 14, wherein step b) rotates the captured video frame including the ROI, and the ROI is cropped from the captured video frame.

22. The vehicle detection system according to claim 14, wherein the ROI is defined as one of a polygon, an ellipse, and a parallelogram shape.

23. The vehicle detection system according to claim 14, wherein the classifier is trained with video frames acquired from the fixed parking occupancy video camera.

24. The vehicle detection system according to claim 23, wherein the classifier is trained with positive samples of video including a detected vehicle and negative samples of video not including a detected vehicle.

25. The vehicle detection system according to claim 14, wherein the parking region includes one or more of street parking, spot parking and parallel parking.

26. A computer implemented method of determining parking occupancy associated with a vehicle parking region comprising:
   a) capturing a video frame from a parking occupancy video camera directed towards the vehicle parking region;
   b) rotating the captured video frame by a predetermined orientation angle of a longitudinal axis associated with a ROI (Region of Interest) associated with the captured video frame, relative to an orientation of an axis associated with an image plane associated with the captured video frame, the ROI including one or more parking spaces of the parking region; and
   c) performing a sliding window-based 2-D (Dimensional) space search for a vehicle within the ROI associated with the rotated captured video frame, the sliding window-based 2-D space search extracting one or more features associated with each of a plurality of windows and accessing a classifier to classify each window as including a vehicle or not including a vehicle.

27. The computer implemented method of determining parking occupancy according to claim 26, wherein step c) performs non-maxima suppression.

28. The computer implemented method of determining parking occupancy according to claim 26, wherein
   steps a)-c) are performed for a plurality of captured video frames; and
   step c) performs the sliding window-based 2-D space search along an x-axis associated with the ROI at various window widths, and the classifier is trained with video frames acquired from the fixed parking occupancy camera, the video frames including positive samples of video including a detected vehicle and negative samples of video not including a detected vehicle.

29. The computer implemented method of determining parking occupancy according to claim 28, wherein step c) extracts one or more feature vectors associated with each of the plurality of windows, and the classifier is a SVM (Support Vector Machine).

30. A computer implemented method of detecting a vehicle in a video frame, the video frame acquired from a fixed parking occupancy video camera including a field of view associated with a vehicle parking region, the method comprising:
  a) capturing a video frame from the fixed parking occupancy video camera, the video frame including a ROI (Region of Interest) oriented by an orientation angle relative to an orientation of an image plane associated with the captured video frame, the ROI including one or more parking spaces of the vehicle parking region; and
  b) performing a sliding window-based 2-D (Dimensional) Space Search for a vehicle with the ROI, the sliding window-based 2-D space search extracting one or more features associated with each of a plurality of windows and accessing a classifier to classify each window as including a vehicle or not including a vehicle,
  wherein step b) performs the sliding window-based 2-D space search along an orientation axis of the ROI associated with the orientation angle of the ROI relative to the orientation of the image plane.

* * * * *